INVENTOR.
JACQUES J. H. CROYMANS
BY
AGENT

United States Patent Office 3,379,946
Patented Apr. 23, 1968

3,379,946
DEVICE INCLUDING AN ELECTRIC MOTOR WHEREIN A CAPACITOR IS CHARGED AND DISCHARGED THROUGH A MOTOR WINDING
Jacques Johannes Hendrik Croymans, Emmasingel, Eindhoven, Netherlands, assignor to North American Philips Company, Inc., New York, N.Y., a corporation of Delaware
Filed Feb. 10, 1965, Ser. No. 431,636
Claims priority, application Netherlands, Feb. 21, 1964, 64—1,622
4 Claims. (Cl. 318—138)

ABSTRACT OF THE DISCLOSURE

A stepping motor having a single energizing winding is provided with a pulsing circuit having a single pole double throw automatically returning to rest switch which, in first position pulses the energizing winding and charges a capacitor, and in second position, allows the capacitor to discharge through the energizing winding. The double pulsing allows the motor to take two steps for each switching operation.

The invention relates to electric motors and more particularly to stepping motors including a stator with fixed magnetic poles and a rotor which is movable with respect to the stator and which has magnetic poles, the strength and the direction of the field of which depend upon the current through an energizing winding, for example, a self-starting synchronous motor of the general type described in Austrian patent specifications 201,710 and 202,219.

It is the object of the invention to provide an electromagnetic stepwise driving device, the rotor of which moves by one step in a given direction with respect to the stator each time a switch is switched.

In accordance with the invention, the energizing winding of the motor is supplied with pairs of current pulses of alternate polarities by a direct current source through a capacitor and a double throw switch which automatically returns to a given rest condition. The switch connects the terminal of the capacitor remote from the winding alternately with one and then with the opposite terminal of the direct current source so that, with every double switching of the switch, the rotor armature moves by two steps in a particular direction with respect to the stator.

In order that the invention may readily be carried into effect, it will now be described in greater detail, by way of example, with reference to the accompanying drawing, in which.

Figure 1:
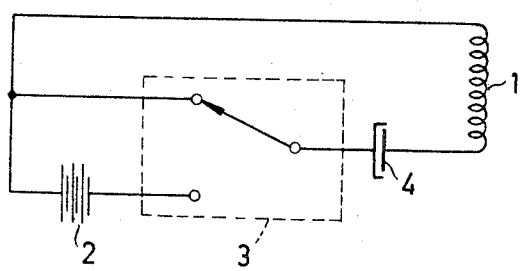
FIG. 1 is the electric circuit diagram of a first embodiment of the device according to the invention.

The device shown in FIG. 1 comprises a synchronous motor of which only the energizing winding 1 is shown. One terminal of this winding is directly connected to the one, for example positive, terminal of a direct voltage source 2, for example, a dry battery or an accumulator, and to one of the fixed contacts of a double throw switch 3. The other fixed contact of this switch is connected to the other, for example negative, terminal of the source 2 and its movable contact is connected to the terminal of corresponding polarity of an electrolytic capacitor 4. The other, for example positive, terminal of this capacitor is connected to the remaining terminal of the winding 1.

In the shown position of the switch 3, for example in the rest position, the capacitor 4 is discharged. When the switch 3 is set from this position to its other position, a negative current pulse with an energy of $10^{-6} \, CV^2/2$ volt×coulombs, wherein C is the capacitance of the capacitor 4 in the $\mu f$. and V is the voltage of the source 2 in volts, is applied, through the capacitor 4, to the upper terminal of the winding 1.

The capacitance C and/or the voltage V must of course be adapted to the inertia of the motor and to the required maximum driving torque, so that the rotor of the motor is moved by one step in a given direction by this energy with respect to its stator. When the number of poles of the rotor and stator are mutually equal, this step in general corresponds to half the distance or angle between two successive similar magnetic poles of the stator or of the rotor.

When the switch 3 returns to its original position the capacitor 4, which has meanwhile charged to the voltage of the source 2, discharges through this switch and the winding 1. The discharge current pulse flows in an opposite direction through the winding 1, again has an energy of $\frac{1}{2} \, 10^{-6} \, CV^2$, and moves the rotor one step further in the same direction.

The direction of movement of the rotor of the motor with respect to its stator depends upon the direction of the current pulse and upon the rest position of rotor with respect to the stator at the instant when this current pulse flows through the winding 1.

Electric motors of the said type, in particular synchronous motors, are in general self-starting in a direction which is not determined beforehand, dependent upon the rest position and upon the instantaneous value of the supply voltage at the instant when this voltage is switched on, in case no particular measures have been taken to determine the direction of movement. Undesired reversals of the direction of movement can of course be prevented, for example, by means of a magnetic backward-run blocking device described in the above-mentioned patent specifications, or by means of a mechanical blocking device described, for example, in French patent specification 1,211,715.

The switch 3 preferably is a tilting double throw switch, as a result of which every hesitation and/or division of the current pulses is prevented. It will also be a switch which automatically always returns to the same rest position, for example, a push-button switch. With such a switch two successive current pulses of opposite directions through the winding 1 are produced when depressing and releasing the switch, so that the rotor of the motor moves by two steps in a given direction with every depression of the push-button switch. In this case the position shown in which the capacitor 4 is discharged may be chosen as the rest position.

In a particularly advantageous embodiment of the device according to the invention the winding 1 is that of a synchronous motor, for example, of the type described in Austrian patent specification 202,219, in which this winding is provided on a stator of the motor that the current through this winding produces a main field and an auxiliary field derived therefrom, as a result of which the direction of movement of the movable armature of the motor with respect to its fixed armature is determined. A main field and an auxiliary field are then produced with every current pulse through the energizing winding. If the direction of the first current pulse of a pair of current pulses is not that corresponding to the instantaneous rest position of the motor, the auxiliary field operates in the wrong direction, the motor remains stationary and starts in the direction determined by the auxiliary field when the second current pulse of reverse polarity of the pair of current pulses occurs.

Such a device may be fed, for example, by a small battery and is very suitable as a remote-indicating device.

Figure 2:
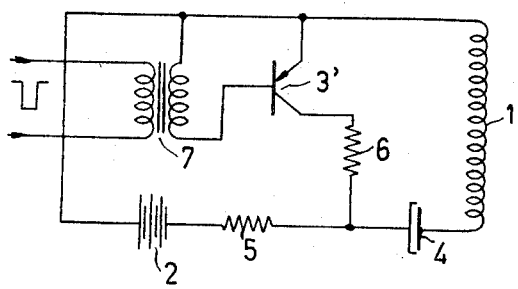
FIG. 2 is the circuit diagram of a second embodiment.

In the embodiment diagrammatically shown in FIG. 2 the mechanical switch 3 of FIG. 1 is replaced by a switching transistor 3' of the pnp type, for example, a Philips transistor of the type OC26. The collector of this transistor is connected to the negative terminal of the source 2, of, for example, 24 volts, through a charging resistor 5 of, for example, 20 ohms and a discharging resistor 6 of also 20 ohms, and the common point of these two resistors is connected to the terminal of corresponding polarity of the electrolytic capacitor 4, of, for example, 40 µf. The emitter of the transistor 3' is directly connected to the positive terminal of the source 2 and to the winding 1 which has a resistance of, for example, 90 ohms.

Control pulses are applied in the forward direction between the base and the emitter of the transistor 3' through a separating transformer 7. In the rest condition, i.e. in the absence of a control pulse, the transistor 3' is cut off since its base is connected to its emitter through the secondary of the transformer 7. The capacitor 4 is thus charged to the voltage of the source 2 through the winding 1 and the resistor 5. When a negative control pulse of a duration of a few milliseconds, for example 10 milliseconds, is applied to the base of the transistor 3', the capacitor 4 discharges through the resistor 6, the collector-emitter-electrode path of the transistor and the winding 1. After termination of the control pulse, the transistor 3' is again cut off and the capacitor is charged again through the resistor 5 and the winding 1.

With every control pulse, a current pulse of a first direction and an energy of $10^{-6} CV^2/2$ volts coulombs thus first flows through the winding 1, as a result of the discharge of the capacitor 4 and then, a current pulse of opposite direction and of approximately the same energy flows through said winding as a result of the capacitor 4 being charged again.

Figure 3:
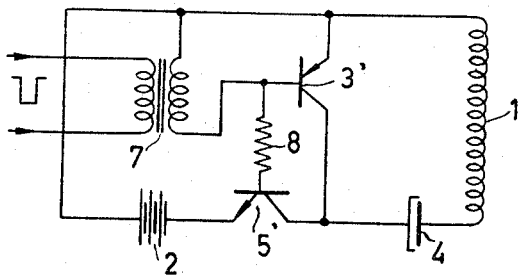
FIG. 3 is the circuit diagram of a modification hereof.

In the modification shown in FIG. 3, the charging resistor 5 of FIG. 2 is formed by the emitter-collector-electrode path of a second transistor 5' to the base electrode of which the control pulses are applied by means of the separating transformer 7, in a manner such that this second transistor is conductive when the transistor 3' is cut off and conversely. The transistor 5' is, for example, of the opposite type with respect to the transistor 3' and its base is connected to that of the transistor 3' through a resistor 8. In the rest condition, the transistor 5' is conducting and when the capacitor 4 is being charged, its base current is limited by the resistor 8. The resistor 6 of FIG. 2, which serves for making the peak value of the discharge current of the capacitor 4 approximately as large as its charge current, is superfluous in the modification shown in FIG. 3.

Such devices can be used in all cases in which stepping motors are required, for example, in remote control and/or indicating systems, for programming, in the digital control of machine tools etc.

What is claimed is:

1. In combination with an electric motor having a two terminal energizing winding for imparting step-wise rotational energy to said motor, a driving circuit for providing pairs of stepping pulses to said energizing winding, comprising, a direct current voltage supply having two terminals of opposite polarities, energy storage means having two terminals, means connecting one of said energizing winding terminals to one of said energy storage means terminals, means connecting the other terminal of said energizing winding to one terminal of said direct current voltage supply, a two position switch having a first position terminal, a second position terminal and a common terminal, said switch automatically returning to one of said position terminals after each switching of said switch to the other of said position terminals independently of the charge level on said energy storage means, said common terminal being connected to the other terminal of said energy storage means, said second position terminal being connected to the other terminal of said direct current voltage supply for causing said energy storage means to charge through said energizing winding, and said first position terminal being connected to the said other terminal of said energizing winding for causing said energy storage means to discharge through said energizing winding.

2. The combination of claim 1 wherein said switch automatically returns to said second position.

3. The combination of claim 1 wherein said switch comprises a transistor having emitter, base and collector electrodes, the emitter collector path of said transistor connected in series with a first resistance means between said second position terminal and said common position terminal, second resistance means connecting said first position terminal and said common position terminal, and means applying switching pulses to the base of said transistor.

4. In combination with an electric motor having a two terminal energizing winding for imparting step-wise rotational energy to said motor, a driving circuit for stepping said motor by providing pairs of stepping pulses to said winding, said driving circuit comprising, a direct current voltage supply, a first transistor having a first polarity and including base, emitter and collector electrodes, a capacitor, means connecting the emitter-collector path of said first transistor, said capacitor, said driving winding and said voltage supply in series circuit arrangement, a second transistor having a second polarity and including emitter, base and collector electrodes, means connecting the emitter-collector path of said second transistor in parallel circuit arrangement with that portion of said series circuit arrangement including said capacitor and said energizing winding, means for rendering said first transistor normally conductive and said second transistor normally nonconductive whereby said capacitor assumes a charged condition through said driving winding, and means for substantially simultaneously applying pulses to the respective base electrodes of said first and second transistors, each of said transistors responding to pulses of one polarity to switch to their opposite conductivity conditions for discharging said capacitor through said driving winding.

References Cited

UNITED STATES PATENTS

| | | | |
|---|---|---|---|
| 2,298,003 | 10/1942 | Feingold | 321—49 |
| 2,555,305 | 6/1951 | Alty | 321—15 XR |
| 3,047,789 | 7/1962 | Lowry | 321—36 XR |
| 3,241,018 | 3/1966 | Stockman | 318—259 XR |
| 3,309,592 | 3/1967 | Favre | 318—138 |
| 3,156,858 | 10/1964 | Reitherman | 318—138 |

ORIS L. RADER, *Primary Examiner.*

BENJAMIN DOBECK, *Examiner.*

G. SIMMONS, *Assistant Examiner.*